United States Patent Office 2,891,067
Patented June 16, 1959

2,891,067
PREPARATION OF ISONICOTINIC ACID HYDRAZIDE

Sudhir Lal Mukherjee, Calcutta, India, assignor of one-half to Albert David Ltd., Calcutta, India, a company of India No Drawing. Application February 8, 1957
Serial No. 638,915

6 Claims. (Cl. 260—295)

This invention relates to a process for the preparation of isonicotinic acid hydrazide, a potent anti-tubercular chemotherapeutic compound.

It is already known to prepare isonicotinic acid hydrazide by the inter-action of isonicotinic acid ester or isonicotinic acid chloride or anhydride with hydrazine hydrate.

These known processes have the drawbacks, namely, (a) that they are bound to be more expensive than a process in which the starting material will be isonicotinic acid itself, instead of its ester, acid-chloride or anhydride, and (b) that the recovery of the unreacted starting material i.e. isonicotinic acid in the preparation of ester or acid chloride and that of the unreacted ester or acid chloride, if any, from the resulting isonicotinic acid hydrazide in the final stage are not so convenient.

Moreover, the reaction of isonicotinic acid with hydrazine will produce only the additive compound of isonicotinic acid and hydrazine, i.e. the hydrazonium salt of isonicotinic acid and not the isonicotinic acid hydrazide which can result only by the elimination of the water from the hydrazonium salt.

By hydrozonium salt of isonicotinic acid is meant the primary product of reaction (the additive compound formed by reaction) between the isonicotinic acid and hydrazine hydrate as described in Example 4 below.

This invention has for its object an improved process for the preparation of isonicotinic acid hydrazide, which process will be free from the drawbacks above referred to.

With this object in view this invention consists of an improved process for the preparation of isonicotinic acid hydrazide which is characterised in that the said hydrazide is produced by the elimination of water from the hydrazonium salt of isonicotinic acid, or from a mixture of isonicotinic acid and hydrazine in which the said hydrazonium salt is formed in a solution but from which it has not been isolated.

In a practical embodiment of this invention, a mixture of isonicotinic acid and hydrazine hydrate are subjected to gradual distillation under reflux by heating them under a reflux in the presence of a solvent comprising a lower aliphatic alcohol such as n-butyl alcohol, n-amyl alcohol or ethyl alcohol, and a diluent comprising an aromatic hydrocarbon such as toluene, xylene or benzene which will act also as a water entrainer. One or more of the solvents and diluents may be used.

The mixture of isonicotinic acid, hydrazine hydrate and the solvent and the diluent may be heated at a temperature of 110° to 170° for a period of 10 to 30 hours, and the solvent, diluent and water may be removed during and/or after the completion of the reaction by distillation.

The progress of the reaction may be followed by the amount of water formed and separated in the distillate.

So long as the reaction continues, the distillate will contain an aqueous layer and a layer of a mixture the solvent and the diluent. The said mixture of the solvent and diluent in the distillate may be separated from the aqueous layer in the distillate, and it may be continuously or periodically led back to the reaction mixture.

The principal advantage of the present invention as compared to the prior art stated above lies in eliminating the preparation of the intermediate ester or acid chloride or anhydried of isonicotinic acid by the usual conventional method, which affords a substantial economy in the preparation of isonicotinic acid hydrazide.

The invention will now be particularly described with reference to the examples given below:

EXAMPLES.—GENERAL CONDITIONS IN WHICH THE EXPERIMENTS WERE CARRIED OUT

In the examples given below, the following experimental conditions were observed:

(i) The isonicotinic acid used as the starting material had a melting point of 310° C.

(ii) The hydrazine hydrate used as the starting material was of 95% w./v.

(iii) Except in the case of Example III, the reaction mixture was subjected to gradual distillation under reflux by heating in an oil bath.

(iv) The progress of the reaction was followed by the amount of water formed and separated in the distillate.

(v) So long as the reaction continued, the distillate contained an aqueous layer and a layer of a mixture the solvent and the diluent; the said mixture of the solvent and diluent in the distillate was separated from the aqueous layer in the distillate, and it was continuously led back to the reaction mixture.

(vi) The period of distillation given is the time taken for completing the reaction under the particular conditions of the example concerned.

(vii) The final isonicotinic acid hydrazide obtained by purification and crystallisation had a melting point of 170°–173° C.; it showed no depression in melting point when mixed with an authentic sample of isonicotinic acid hydrazides; and it formed benzylidine isonicotinyl hydrazone melting at 196°–198° C.

*Example I.—Preparation of isonicotinic acid hydrazide, using N-butyl alcohol as solvent and toluene as diluent*

A mixture of:
Isonicotinic acid _____ gms___ 24.6
Hydrazine hydrate _____ cc___ 13
N-butyl alcohol _____ cc___ 50
Toluene _____ cc___ 100 was subjected to gradual distillation under reflux by heating in an oil bath at 130°–160° C.

After the reaction was over (in about 24 hours), the solvent and the diluents were distilled off, and the residue was extracted in the cold with ethanol (800 cc.). The ethanol extract was then treated with charcoal, filtered and the filtrate on concentration gave crude isonicotinic acid hydrazide (18.0 gms.), M.P. 165–170° C. On further purification and crystallisation from ethanol and water, the crude product gave isonicotinic acid hydrazide (12.0 gms.), M.P. 170–173° C. This compound showed no depression in melting point when mixed with an authentic sample of isonicotinic acid hydrazide. It also formed isonicotinyl hydrazone, M.P. 196–198° C., benzylidine.

By concentrating all the combined mother-liquors obtained from isonicotinic acid hydrazide crystallisation and through subsequent hydrolysis with dilute alkali and acidification of the hydrolysed liquor with dilute hydrochloric acid to pH 3, isonicotinic acid (10.0 gms.), M.P. 310° C. was recovered.

*Example II.—Preparation of isonicotinic acid hydrazide, using ethanol as solvent and toluene as diluent*

A mixture of:

| | | |
|---|---|---|
| Isonicotinic acid | gms | 24.6 |
| Hydrazine hydrate | cc | 13 |
| Ethanol | cc | 50 |
| Toluene | cc | 100 | was subjected to gradual distillation under reflux by heating in an oil bath at 120–150° C.

After the reaction was over (in about 30 hours), the solvent and the diluents were distilled off and the residue was extracted in the cold with ethanol (800 cc.). The ethanol extract was then treated with charcoal, filtered and the filtrate on concentration gave crude isonicotinic acid hydrazide (17.0 gm.), M.P. 165–170° C. On further purification and crystallisation from ethanol and water, the crude product gave isonicotinic acid hydrazide (11.4 gms.), M.P. 170–73° C. This compound showed no depression in melting point when mixed with an authentic sample of isonicotinic acid hydrazide and also formed benzylidine isonicotinyl hydrazone, M.P. 196–198° C.

Isonicotinic acid, 8.0 gm., M.P. 310° C., was recovered from the mother-liquors by the method as described under Example I.

*Example III.—Preparation of isonicotinic acid hydrazide using N-butyl alcohol as solvent and toluene as diluent*

A mixture of:

| | | |
|---|---|---|
| Isonicotinic acid | gms | 24.6 |
| Hydrazine hydrate | cc | 11 |
| N-butyl alcohol | cc | 80 |
| Toluene | cc | 100 | was refluxed by heating in an oil bath at 120–140° C. for 30 hours. The solvent and the diluent were distilled off and the residual solid was extracted with ethanol (500 cc.). The ethanol extract was treated with charcoal and filtered. The filtrate on concentration gave isonicotinic acid hydrazide (crude), 5.0 gms., M.P. 165–170° C. On further purification and crystallisation from ethanol and water gave isonicotinic acid hydrazide, 3.4 gms., M.P. 170–173° C. The compound showed no depression in melting point when mixed with an authentic sample of isonicotinic acid hydrazide and it also formed benzylidine isonicotinyl hydrazone, M.P. 196–198° C.

Isonicotinic acid, 18 gm., M.P. 310° C., was recovered from the mother-liquors by the method as described under Example I.

*Example IV.—Preparation of isonicotinic acid hydrazide by preparing the hydrazonium salt of isonicotinic acid as an intermediate product*

(i) PREPARATION OF THE HYDRAZONIUM SALT

To a suspension of 24.6 gm. of finely powdered isonicotinic acid in 50 cc. of ethanol in a flask, is added 13 cc. of hydrazine hydrate with stirring. The mixture was then warmed on water bath to obtain a complete solution. Ethanol was then distilled off when the hydrazonium salt of isonicotinic acid was obtained as a white solid, hydroscopic in nature.

(ii) USE OF N-BUTYL ALCOHOL AS SOLVENT AND TOLUENE AS DILUENT

To hydrazonium salt of isonicotinic acid (30 gm.) as obtained above, was added toluene (100 cc.) and n-butyl alcohol (50 cc.) and the mixture was subjected to gradual distillation under reflux by heating in an oil bath at 130–140° C.

After the reaction was over (in about 20 hours), the solvent and diluent were distilled off and the residue was extracted in the cold with ethanol 800 cc. The ethanol extract was then treated with charcoal, filtered and the filtrate on concentration gave crude isonicotinic acid hydrazide, 18 gms., M.P. 165–170° C. On further purification and crystallisation from ethanol and water, isonicotinic acid hydrazide, 12 gms., M.P. 170–73° C., was obtained. This compound showed no depression in melting point when mixed with an authentic sample of isonicotinic acid hydrazide and it also formed benzylidine isonicotinyl hydrazone, melting at 196–198° C.

Isonicotinic acid, 10 gms., M.P. 310° C., was recovered from the mother-liquors during isonicotinic acid hydrazide crystallization by the method as described in Example I.

*Example V.—Preparation of isonicotinic acid hydrazide using N-amyl alcohol as solvent and benzene and xylene as diluents*

A mixture of:

| | | |
|---|---|---|
| Isonicotinic acid | gms | 24.6 |
| Hydrazine hydrate | cc | 13 |
| N-amyl alcohol | cc | 100 |
| Benzene | cc | 50 |
| Xylene | cc | 100 | was subjected to gradual distillation under reflux by heating in an oil bath at 150–170° C.

After the reaction was over (in about 15 hours), the solvent and diluent were distilled off and the residual solid was extracted with cold ethanol (800 cc.) filtered and concentrated when crude isonicotinic acid hydrazide, 13.5 gm., M.P. 160–170° C., was obtained. On further purification and crystallisation from ethanol and water, isonicotinic acid hydrazide (9 gms.), M.P. 170–173° C., was obtained.

Isonicotinic acid (9 gms.), M.P. 310° C., was recovered from the mother-liquors as described in Example I.

*Example VI.—Preparation of isonicotinic acid hydrazide using N-butyl alcohol and ethanol as solvents, and toluene and benzene as diluents*

A mixture of:

| | | |
|---|---|---|
| Isonicotinic acid | gms | 24.6 |
| Hydrazine hydrate | cc | 13 |
| N-butyl alcohol | cc | 75 |
| Ethanol | cc | 50 |
| Toluene | cc | 100 |
| Benzene | cc | 50 | was subjected to gradual distillation under reflux in an oil bath at 130°–160° C.

After the reaction was over (in about 16 hours), the solvent and diluent were then distilled off and the residual solid was extracted with cold ethanol (800 cc.), filtered and concentrated when crude isonicotinic acid hydrazide, 15 gms., M.P. 160–170°, was obtained. On further purification and crystallisation from ethanol and water, isonicotinic acid hydrazide (10 gms.,), M.P. 170–173° C., was obtained. Isonicotinic acid (10 gms.), M.P. 310° C., was recovered from mother-liquors by methods as described in Example I.

Although in all the examples, we have mentioned that the solvent and diluent from the distillate, after their separation from the water present in the distillate, were returned to the reaction mixture continuously, the experiments may be modified by returning the solvent and the diluent from the distillate, periodically, instead of continuously.

What I claim is:

1. An improved process for the preparation of isonicotinic acid hydrazide by the elimination of water from the hydrazonium salt of isonicotinic acid which includes the steps of subjecting a mixture of isonicotinic acid, hydrazine, a lower alkanol solvent, and a water-entraining mononuclear aromatic hydrocarbon diluent to distillation at a temperature of 110–170° C. to remove water, continuing the distillation until substantially no more water is removed, and recovering isonicotinic acid hydrazide.

2. An improved process for the preparation of isonicotinic acid hydrazide by the elimination of water from the hydrazonium salt of isonicotinic acid which includes the steps of subjectng a mixture of isonicotinic acid, hydrazine, a lower alkanol solvent, and a water-entraining mononuclear aromatic hydrocarbon diluent to distillation at a temperature of 110–170° C. for a period of 10 to 30 hours to gradually remove water, solvent and diluent from the reaction mixture and recovering the isonicotinic acid hydrazide.

3. The process of claim 2 wherein said alkanol solvent is selected from the group consisting of ethyl alcohol, n-butyl alcohol, n-amyl alcohol and mixtures thereof.

4. The process of claim 2 wherein said hydrocarbon diluent is selected from the group consisting of benzene, toluene, xylene and mixtures thereof.

5. The process of claim 2 wherein said distillation is carried out under reflux.

6. The process of claim 2 wherein a mixture of solvent and diluent is recovered from the distillate and recycled to the reaction mixture.

References Cited in the file of this patent

FOREIGN PATENTS

| | | |
|---|---|---|
| 1,088,228 | France | Sept. 8, 1954 |
| 724,256 | Great Britain | Feb. 16, 1955 |
| 305,891 | Switzerland | May 16, 1955 |